Nov. 13, 1956 L. E. AUSTIN 2,770,269
POWER SCREW DRIVER
Filed Jan. 12, 1951 6 Sheets-Sheet 1

INVENTOR.
Leonard E. Austin
BY Moore, Olson & Trexler
attys.

Nov. 13, 1956  L. E. AUSTIN  2,770,269
POWER SCREW DRIVER
Filed Jan. 12, 1951  6 Sheets-Sheet 3

INVENTOR.
Leonard E. Austin
BY
Moore, Olson & Trexler
attys.

Nov. 13, 1956 L. E. AUSTIN 2,770,269
POWER SCREW DRIVER
Filed Jan. 12, 1951 6 Sheets-Sheet 4

INVENTOR.
Leonard E. Austin
BY
Moore, Olson & Trexler
attys.

Nov. 13, 1956 L. E. AUSTIN 2,770,269
POWER SCREW DRIVER
Filed Jan. 12, 1951 6 Sheets-Sheet 6

INVENTOR.
Leonard E. Austin
By: Moore, Olson & Trexler
attys

United States Patent Office 2,770,269
Patented Nov. 13, 1956

2,770,269

POWER SCREW DRIVER

Leonard E. Austin, Chicago, Ill., assignor to Illinois Tool Works, Chicago, Ill., a corporation of Illinois Application January 12, 1951, Serial No. 205,804

23 Claims. (Cl. 144—32)

This invention is concerned with a power driver for inserting fastening elements, particularly rotary threaded fastening elements, and the invention is particularly concerned with a portable power screw driver carrying a supply of screws in a magazine.

In assembly operation wherein a plurality of parts is secured together by fasteners inserted by a power driver, it is not desirable to have to position the fasteners one at a time by hand. Such positioning is slow and is dangerous to the operator. Many power drivers have been devised for feeding fasteners by gravity to the driving member. Such drivers generally operate only on a work piece of fixed, predetermined position, usually horizontal and sometimes vertical.

In assembly operations on many products, such as automotive vehicles, it is necessary to insert fasteners in many relatively inaccessible places. The positions in which the fasteners must be inserted are oriented in practically every conceivable manner, and it is generally not practicable to change the orientation. My invention contemplates the provision of a power driver having a magazine wherein fasteners are driven positively by a spring to allow operation of the driver in any position.

It is desirable when an operator is working on any particular location of an assembly operation to be able to remain at that location for an extended period without the necessity of obtaining additional fasteners. Fastener feeding structure extending to a power driver from a remote storage location would render the apparatus unwieldly as would a magazine of extraordinary size which further would make it impossible to reach many relatively inaccessible locations.

An object of this invention is the provision of a portable power driver wherein fastener elements are automatically positioned before the driving member and wherein the driver is usable in any position.

An object of this invention is the provision of a portable power driver utilizing a magazine wherein fasteners are fed positively to allow utilization of the driver in any position.

A more specific object of this invention is the provision of a portable power driver wherein fastening elements are fed through a magazine under the driving force of a spring member or other positive means to facilitate operation of the driver in any position.

Yet another object of this invention resides in the provision in a portable power driver of a fastener supplying mechanism wherein fasteners are force fed and are released one at a time by an escapement mechanism located immediately adjacent fastener holding and positioning means to position fasteners directly in front of the driver.

A further object of this invention lies in the provision in a portable power driver of a combination feed and escapement mechanism operable in timed relation with a driving member wherein the mechanism positively pushes a fastener into alignment with the driving member.

Yet another object of this invention is the provision in a portable power driver of a fastener feeding mechanism part of which is adjustable or replaceable for operation with fasteners of different sizes or ranges of sizes.

Another object of this invention resides in the provision in a portable power driver of a readily accessible adjustable member in linkage interconnecting fastener feeding mechanism and a driving member rendering the power driver operable with fasteners of various sizes.

Upon emptying, or partially emptying, a magazine of fasteners, it is necessary to refill the magazine. It is tedious to fill the magazine by hand, fastener by fastener, or for an operator to have to determine the proper number of fasteners inserted in the magazine from same mechanical source. This invention contemplates the provision of a screw feed hopper with metering mechanism adapted to discharge a predetermined number of fasteners into a magazine to fill an empty magazine or with mechanism for discharging the proper number of fasteners completely to fill a partially empty magazine.

Often it is not desirable to utilize a fastener feeding hopper. This is particularly apt to be the case when a demand for fasteners is comparatively small or it is not practical to run a hopper near an assembly station. It is therefore an object of this invention to provide a disposable fastener carrying cartridge operable upon cooperative engagement with a fastener magazine to discharge a predetermined number of fasteners into the magazine.

Other and further objects and advantages of the present invention will be apparent from the following description when taken in conjunction with the accompanying drawings, wherein.

Referring now in greater particularity to the drawings, in Figs. 1–10 there is shown a portable power screw driver 30 embodying the principles of my invention. The screw driver may be electrically or pneumatically operated and for purposes of illustration I have shown a pneumatic screw driver of conventional construction with the addition of certain structure as will be apparent hereinafter. The screw driver includes a pneumatic motor 32 which may be of the conventional multi-vane type. A hose pipe connector 34 is provided at the top of the driver for connection to a flexible pneumatic hose 36 supplying compressed air to the screw driver. A plunger 38 near the top end of the driver actuates a valve to admit air to the motor to operate the screw driver.

A screw driving bit 40 extends from the bottom of the screw driver and is coupled to the motor by conventional means including a clutch releasable at a predetermined torque to prevent damage to the screws or work piece. This construction is well known in the art and the details thereof have been omitted.

Screws are retained and positioned in front of the driver 40 by means of a pair of catcher arms 42. The arms are semi-cylindrical in shape and are provided near the top ends with enlarged portions 44. Radially extending arcuate flanges 46 are provided at the top edges of the enlarged portions 44, and these flanges fit within a sleeve 48 and are retained therein by an inturned flange 50. The sleeve 48 is slidably mounted on a barrel 52 depending from the motor 32. A coil spring 54 is compressed between the lower end of the barrel 52 and the flanges 46 normally to maintain the catcher arms 42 in contact with one another. The catcher arms further are maintained in contact with one another by leaf springs 56 secured to the barrel by means such as screws 58.

Each of the catcher arms 40 is provided with a longitudinally recessed portion 60 to permit a screw to be shifted transversely into the space between the catcher arms. The lower part of the aperture formed by the recesses 60 is of sufficient width to permit passage of a screw shank while the upper portion 62 is of sufficient width arcuately of the arms to permit free admission of a screw head. The lower ends of the catcher arms are inturned as at 64 forming a shoulder to catch screw elements 66 by the heads as best may be seen in Figs. 5 and 6. Pressure of the driving member against a screw head forces the underside of the head against the shoulder substantially to align the screw and bring the shank into the aperture between the extremities of the catcher arms. The inner surfaces of the inturned portions 64 are inclined as at 68 to form cam surfaces. The lower end of the driving member 40 is concave in configuration with the exception of the blade 70 so that the driving member most effectively can centralize each screw 66 with respect to the catcher arms.

Downward movement of a screw as caused by the driving member 40 cams the catcher arms 40 apart against the action of springs 54 and 56 to release the screw as will be set forth in greater detail hereinafter.

Screws are supplied automatically to the catcher arms from a magazine 72. The magazine includes a single sheet metal strip or plate 74 extending from the lowermost end of the screw driver adjacent the recesses 60 in the catcher arms to a point above the top of the pipe connector 34. The strip or plate 74 is straight and flat throughout the greater portion of its length and is curved inwardly at the lower end as at 76 and further is beveled somewhat along the edges to reduce the width of the tip.

The upper end of the strip or plate 74 is secured by a bracket 78 including an upstanding arm 80. The lower end of the arm 80 may be secured directly to the pipe connector 34 as by welding or may be secured to the pipe connector by means of a ring or collar 82. The upper end of the bracket 78 is provided with a cross arm 84 having inturned ends 86 fitting around and slidably securing the plate 74.

The strip or plate 74 is secured adjacent its lower end by means of a mounting plate or bracket 88. The mounting plate or bracket 88 is secured to the sleeve 48 preferably by welding thereto and extends substantially tangentially therefrom. The outer edge of the plate or bracket 88 is inturned as at 90 (Fig. 9) and is reversely bent as at 92 at which point it is welded to the plate 74. The turned portion 90 provides an offset from the plate 74 and the purpose of this offset will be apparent hereinafter.

The screw driver or gun 30 is provided with an actuating handle 94 which is pivoted to the body of the driver near the top thereof. A bracket 96 (Figs. 1–3) is secured at the top of the body portion by means of a pin 98. This pin passes through an aperture and normally is the pivot point of an actuating handle for a power screw driver of the type shown herein. The handle 94 is pivotally mounted on a pin 100 near the outer lower edge of the bracket 96 at a position very close to the motor actuating valve plunger 38. A sleeve or boss 102 on the lower portion of the bracket 96 slidably carries a pin 104 which abuts the plunger 38 at one end and is in contact with the actuating handle 94 at the other end. The actuating handle 94 is provided with a transversely extending arm 106 which is suitably curved to extend around and past the motor 32. The arm extends between the motor 32 and the magazine 72 and a connecting rod 108 is pivotally connected to the outer end of the arm. The lower end of the arm is received in a slot 109 in the plate or bracket 88.

The magazine 72 in addition to the plate 74 and mounting structure heretofore disclosed further includes a pair of strips or plates 110 spaced from the plate 74 and carried in substantial parallelism therewith by means of a plurality of spacers 112. The spacers are arranged at intervals along the plate 74 and screws 114 pass through the plates 110 and spacers 112 and are threaded into the plate 74. The strips or plates 110 are spaced from the plate 74 at a distance equal to or slightly greater than the height of the head of a screw 66 (Fig. 9) and the plates 110 are spaced from one another a distance slightly greater than the diameter of a screw shank. The magazine 72 further includes a channel member 116 overlying the space between the strips or plates 110. The channel member 116 includes a laterally extending flange 118 through which some of the screws 114 extend to secure the channel member in position. A side wall 120 extends outwardly from the flange 118 and is inturned to form an end wall 122 and then is bent back upon itself to form a second side wall 124. The end wall 122 is spaced from the plate 74 a distance somewhat greater than the overall height of the screws 66. The channel member 116 is terminated substantially at the lowermost portion of the straight sections of the plates or strips 74 or 110. The side wall 124 as best may be seen in Figs. 7–9 does not extend entirely back to the plate 110. The usefulness of the gap so left will be apparent hereinafter.

Figures 5, 5A, 6, 7, 8, 9, 10:
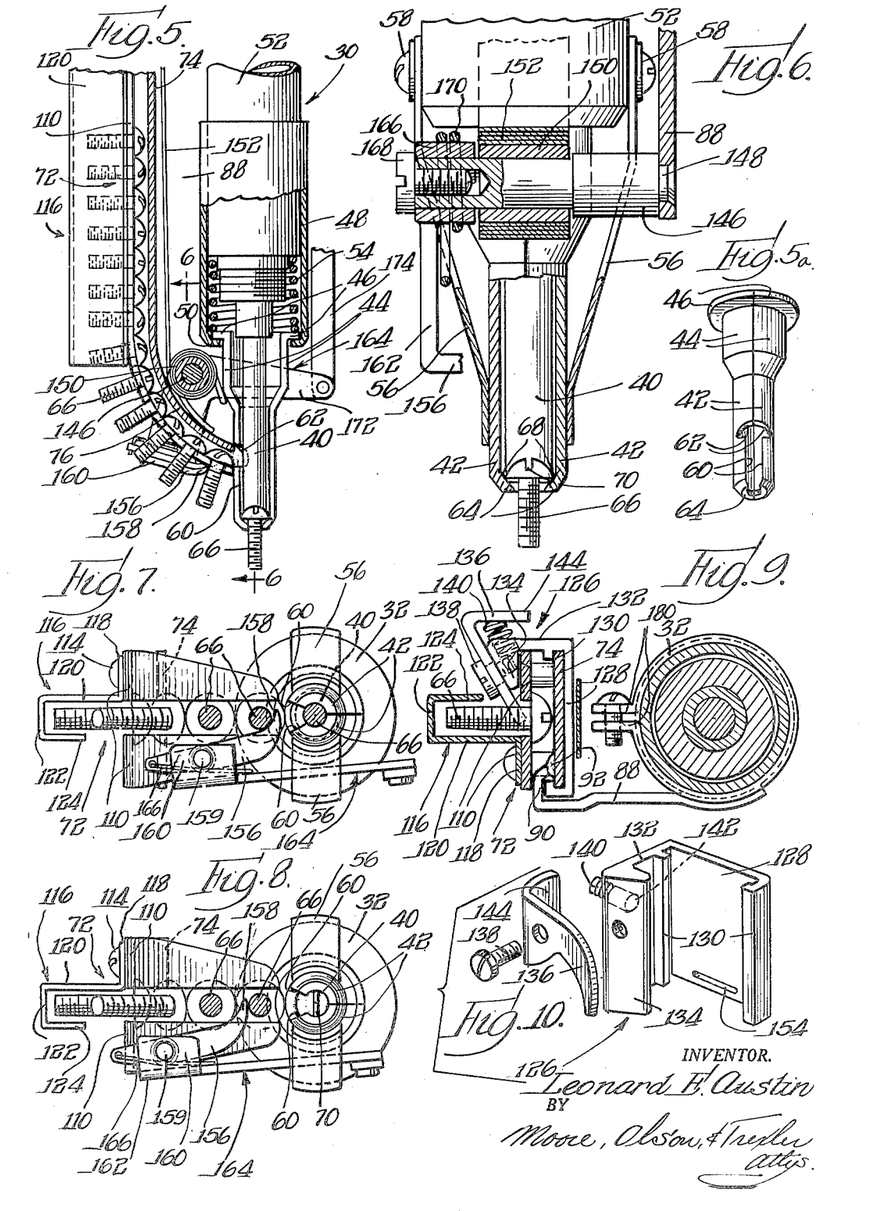
Fig. 5 is an enlarged view partially in section taken along the line 5—5 of Fig. 2.
Fig. 5a is a perspective view of the catcher arms.
Fig. 6 is a view taken along the line 6—6 of Fig. 5.
Fig. 7 is a bottom view of the screw driver.
Fig. 8 is a view similar to Fig. 7 showing the parts in a different position.
Fig. 9 is a cross sectional view along the line 9—9 of Fig. 1.
Fig. 10 is an exploded perspective view showing the parts of the pusher of the screw feeding mechanism.

The magazine 72 further is provided with a slide or pusher 126 best seen in Figs. 9 and 10. The slide comprises a stationary flat plate 128 having inturned longitudinal flanges 130 which slidably secure it to the plate or strip 74. These flanges are suitably dimensioned to allow passage of one of them beneath the offset of the bracket 88 provided by the portions 90 and 92. The slide further includes a side wall 132 extending at substantially right angles to the plate 128 and past the magazine strips or plates 110. A wedge shaped flange 134 on the side wall 132 overlies the plate 110 on the side of the magazine having the narrow channel side wall 124. A pusher finger 136 is pivoted to the flange 134 by means of a screw 138 and a coil spring 140 fitted in a recess 142 in the flange 134 abuts an angularly disposed flange or tail 144 on the pusher finger 136 normally to urge this finger through the slot defined by the channel wall 124 and adjacent strip 110 into the slot between the strips 110 above the uppermost screw 66 in the magazine.

A stud member 146 (Fig. 6) extends transversely from a depending ear on the flange or plate 88 and is secured thereto by peening over the end of a narrow neck 148 on the stud member or by any other suitable means. A sleeve or hollow roller 150 (Figs. 5 and 6) fits about a portion of the stud member 146 of reduced diameter and is freely rotatable thereon. A spring 152 of the strip or ribbon type similar to a clock spring is wound about the roller 150 and has the outer end secured to the slide or pusher 126 as by bending the end of the spring over through a transverse slot 154 in the plate 128 of the slide. The slide is constantly urged toward the roller upon which the spring is mounted and the pusher finger 136 on the slide thus urges screws in the magazine 72 toward the lower end thereof.

An escapement mechanism is provided at the lower end of the magazine and comprises a finger 156 (Figs. 1 and 4–8) having a pointed substantially hook-shaped end or tip 158 adapted to fit between the shanks of adjacent screws 66. The finger 156 is pivotally mounted on a pin 159 between a pair of ears 160 extending laterally from the downwardly extending arm 162 of a bell crank lever 164. A coil spring 166 is looped around the pin 159 and has the ends respectively abutting the arm 162 and engaged in an aperture in the tail of the finger 156 normally to maintain the finger tip 158 in the path of the shanks of screws 66 carried in the magazine 72. The finger tip 158 is transversely deflected to lie between the strips or plates 110 and thus to engage the screw shanks adjacent the heads thereof to prevent tipping and binding of the screws.

The bell crank lever 164 is provided with a sleeve or thimble 166 fitting about the end of the stud member 146 and secured thereon by a screw 168 threaded into a tapped axial bore in the end of the stud member. A coil spring 170 surrounds the sleeve 166 and normally urges the downwardly extending arm 162 of the bell crank lever toward the catcher arms 42. The laterally extending arm 172 of the bell crank lever passes between one of the leaf springs 56 and the adjacent catcher arm 42 and is pivotally connected at its outer end to an actuating link 174. The upper end of the actuating link 174 is slidably received in a sleeve 176 (Figs. 1 and 2) which is closed at its upper end and is secured to the barrel by means of a split clamping ring 178. The clamping ring 178 is provided with opposed parallel ears 180 drawn toward one another by a screw. By loosening and then tightening this screw, it is possible to adjust the clamping ring 178 and the sleeve 176 longitudinally along the barrel 52.

*Operation*

Figure 1:
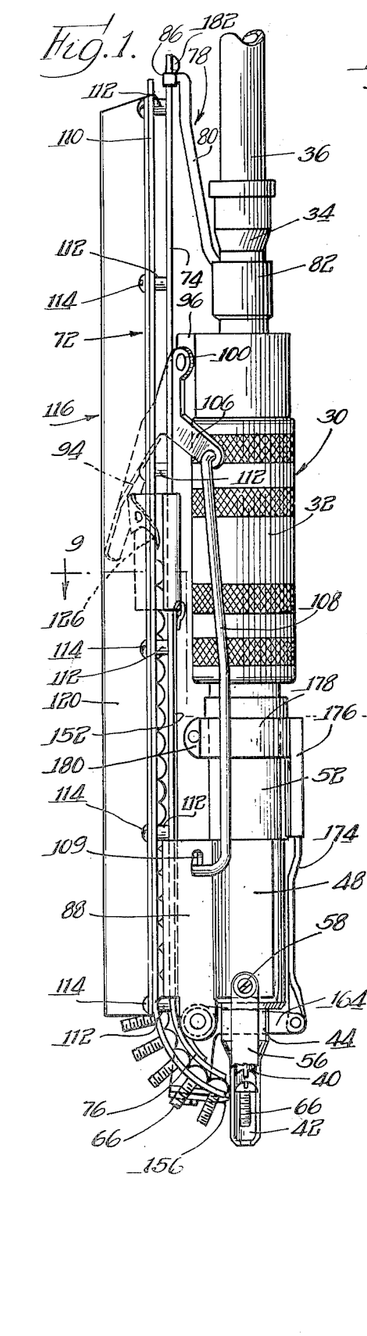
Fig. 1 is a side elevational view of a portable power driven screw driver embodying the principles of my invention.

Prior to the inception of a screw driving operation, the parts will be in the position as shown in Figure 1, part of one of the catcher arms 42 and one of the springs 56 being broken away to show the screw driving member 40 and a screw 66. The screw 66 may be in substantially the position shown in Figure 1 if the head is of sufficient diameter, or it may be anywhere within the space defined between the catcher arms including the inturned lower ends thereof, and the driving member 40. The inturned lower ends provide an arcuate aperture of sufficiently small diameter normally to prevent passage of a screw shank therethrough.

Figures 2, 3, 4:
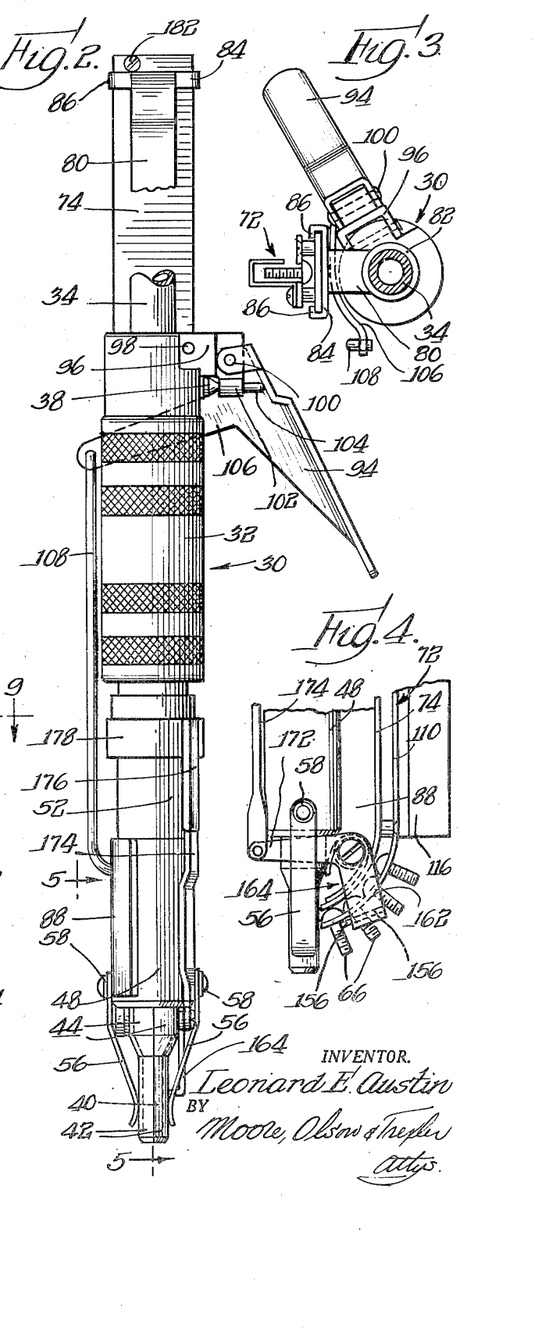
Fig. 2 is an elevational view taken at substantial right angles to Fig. 1.
Fig. 3 is a top view of the portable power screw driver.
Fig. 4 is a fragmentary view of the bottom of the screw driver taken from the opposite side of the view in Fig. 1.

An operator holds the screw driver or gun in any desirable position to drive a screw and squeezes the handle 94 toward the motor 32. Such movement of the handle acts through the pin 104 to depress the plunger 38 and thus to start the motor in operation to rotate the driving member 40. Further movement of the handle causes the arm 106 to pull on the connecting or actuating rod 108 to pull the plate or bracket toward the upper or rear end of the screw driver or gun. This movement shifts the sleeve 48, the magazine 72, and all of the parts carried thereby longitudinally relative to the conventional parts of the screw driver and brings the driving member 40 into engagement with the screw 66 between the catcher arms 42 to shift the screw to the position shown in Figs. 5 and 6 where it readily is driven into a receiving aperture in a work piece. The starting of the rotation of the driving member prior to engagement thereof with a screw aids in engaging the driving blade 70 in the screw slot and further facilitates movement of the screw through the catcher arms. As the screw is advanced completely into the work piece the driving member moves beyond the extremities of the catcher arms. Such movement causes the screw head to cam the catcher arms apart against the action of coil spring 54 and leaf springs 56 to release the driven screw. The inturned end 158 of the finger 156 normally engages the last or lowest screw in the magazine 72 as shown in Figure 7 and thus retains all of the screws in the magazine. After movement of the driving member 40 past the lower end of the magazine, the upper end of the link 174 encounters the closed upper end of the sleeve 176 and thereby is shifted longitudinally relative to the sleeve 48 on the barrel 52 to pivot the bell crank lever 164 counterclockwise as shown in Fig. 4. This causes the tip 158 of the finger 156 to ratchet past the shank of the last screw 66. The biasing spring 166 then causes the finger tip to engage between the last two screws in the magazine. Movement of the parts back to their original position is stopped by abutment of the cross member 84 of the bracket 78 against the head of a screw 132 at the upper end of the plate or strip 74.

The biasing spring 170 pivots the bell crank lever in a clockwise direction as shown in Fig. 4 to force the outermost screw against the side of the driving member 40. When the driving member is withdrawn past the end of the magazine 72, the bell crank lever and finger 156 carried thereby snap the last screw in the magazine into the catcher jaws through the recesses from an aperture therein. This snapping or positive or force feed of a screw into the space between the catcher arms is of utmost importance in allowing the screw driver to be used in any position. It is apparent that the beveled ends of the plate 74 and plates 110 provide clearance for movement of the bell crank lever. As the finger 156 snaps the last screw into the space between the catcher arms, the ribbon spring 152 positively shifts all of the screws in the magazine transversely a distance equal to the distance between the screws. This positive spring or force feeding of the screws also is of utmost importance in allowing the screw driver to be used in any position.

Hopper loading of magazine

Hopper means for feeding screws into the magazine 72 as shown in Figs. 11–15 comprises a screw hopper 184, a feed chute, 186, and metering mechanism 188 on the chute.

The screw hopper 184 comprises a main body casting 190 having a drum portion 192 projecting from one side of the casting and a screw receiving funnel 194 having an inclined rear wall and opening through the front wall of the casting opposite the drum portion 192. The main body casting is also formed with a laterally extending bracket 195 adapted to be secured to any suitable support.

A tumbler drum 196 is mounted in juxtaposition to the outer face of the main hopper casting 190 in position to receive internally thereof screws from the lower open bottom of the hopper funnel 194. The drum 196 is bolted at its outer end to drive disk 198 keyed to a drive shaft 200. The main hopper casting 190 is provided with a projecting boss 202 supporting bearings 204 in which the shaft 200 is journaled. The shaft has an annular shoulder fitting against the inner bearing 204 to prevent endwise movement of the shaft in one direction. The shaft projects through the drive disk 198 and has a clamping nut 206 threaded on its outer end. The drum 196 is provided with a plurality of arcuately spaced axially extending slots 208 of a cross dimension sufficiently greater than the diameter of the screw shanks to permit ready passage of a screw therethrough radially of the drum but sufficiently small in such cross dimension to prevent passage of the screw heads therethrough.

The drum at its inner end is spaced from the outer face or surface 210 of the main body casting 190 a distance equal to or slightly greater than the height of the screw heads so that screws which are lying with their heads proximate the surface 210 and their shanks extending axially of the drum will pass through the slots 208 with their heads passing radially between the inner end of the drum and the surface 210.

Figures 11, 12, 13, 14, 15:
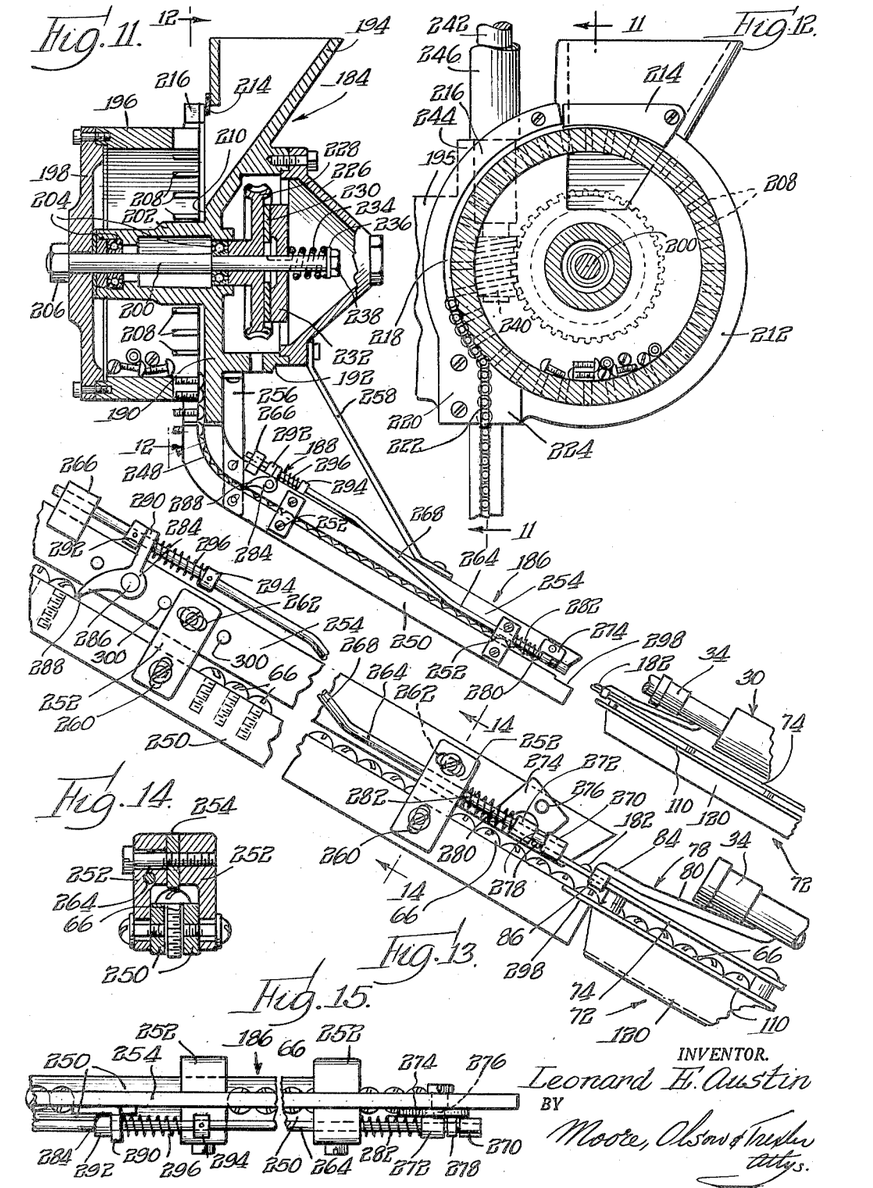
Fig. 11 is a view partially in section showing a hopper and feed chute for metering a predetermined number of screws into the screw driver magazine.
Fig. 12 is a view taken along the line 12—12 of Fig. 11.
Fig. 13 is an enlarged fragmentary view showing the actuation of the metering mechanism by cooperation with the screw driver magazine.
Fig. 14 is a cross sectional view taken along the line 14—14 of Fig. 13.
Fig. 15 is a top view showing the parts of Fig. 13.

A retaining ring of flange 212 is secured to or formed integrally with main body casting and encircles the right side of the drum as shown in Fig. 12. The retaining ring or flange 212 lies in close juxtaposition to the drum so that screws in the bottom part of the drum cannot pass therefrom.

An arcuate closure plate or strip 214 bolted to the main hopper casting extends over a portion of the drum at the top thereof to close the space between the bottom edge of the front wall of the hopper funnel 194 and the rotating tumbler drum 196 to prevent the screws dumped into the funnel from jumping out of the hopper over the rotating drum. A retaining ring 216 is bolted to the main body casting and extends about the left side of the drum as seen in Fig. 12. The retaining ring 216 is spaced radially from the drum so as to form a gravity feed chute 218 for receiving the screws which pass through the slots 208 in the drum. A block 220, which may be integral with the ring 216 forms one side of a vertically extending gravity feed chute 222, the other side of the chute being formed by a block 224 which preferably is mounted so as to be shiftable away from the drum 196 to clear any jammed screws. The upper edge of the block 224 is formed as an arc of a circle lying in close juxtaposition to the periphery of the drum 196 and extending slightly above the upper edge of the block 220 so as to engage the shanks of screws advancing down the curved chute 218 to deflect the screws into the vertical chute 222.

The hopper drug driving shaft 200 extends from the boss 202 into the drum portion 192 of the hopper casting, which is closed by a cover 226 bolted to said drum portion. A worm gear 228 is loosely mounted on the shaft 200 and a friction clutch ring 230 is secured thereto. A driving disk 232 is splined to the shaft 200 for rotation therewith and for axial movement relative therewith. A coil spring 234 encircling shaft 200 is interposed between the driving disk 232 and a washer 236 secured on the shaft by a nut 238. The coil spring 234 maintains the driving disk 232 in driving engagement with the friction clutch ring 230, which rotates with the worm gear 228, but the spring permits outward axial movement of the driving disk 232 to disconnect the shaft from the worm gear should the hopper drum become jammed. As the hopper drum extends away from the main hopper casting, it readily can be manually rotated reversely on slippage of the clutch to break a jam. The worm gear 228 is driven by a worm 240 on the lower end of a vertical shaft 242 journaled in boss 244 of the bracket 195. The shaft 242 is housed in a mounting tube 246 and is driven by any suitable source of power.

The vertical feed chute 222 feeds directly into the inclined screw feeding chute 186, the upper end of which is curved as at 248 to feed screws from the vertical chute to the inclined chute. The inclined chute 186 includes a pair of spaced apart rails 250 secured by screws and suitable brackets 252 to an overhead rail 254. A bracket 256 is secured to the rails 250 and to the rail 254 and further is secured to the main hopper casting 190 to mount the inclined screw feeding chute 186 on the hopper. A diagonal brace 258 extends from the upper or overhead rail 254 to the cover 226 further to brace the chute 186. The screws extending through the brackets 252 connecting the various parts of the chute 186 fit through slots 260 directed transversely of the chute 186 and through slots 262 directed longitudinally of the chute to allow adjustment of the rails relative to one another. Such adjustment generally is made to accommodate different sizes of screws 66 as the rail 254 should be spaced above the rails 250 a distance slightly greater than the height of the screw heads to maintain the screws in the slot defined between two rails 250.

Means for metering a predetermined number of screws from the screw feeding chute 186 into the screw driver magazine 72 includes an elongated rod 264 extending substantially the entire length of the chute 186. The rod is slidably mounted in the lower bracket 252, at which point it is adjacent the lower edge of the rail 254 and further may be supported by a bracket 266 suitably secured to the rail 254 at the upper end thereof and above the top edge, an intermediate portion of the rod 264 being offset as at 268. The lower end of the rod 264 is provided with a pair of enlarged portions or collars 270 and 272. A pawl 274 is pivoted on the rail 254 at 276 and is provided with a fork 278 fitting around the rod 264 between the collars 270 and 272. The pawl further is provided with a pointed nose 280 and has a straight upper edge adjacent this nose. A coil spring 282 is compressed between the lower bracket 252 and the upper collar 272 and normally urges the rod down and the pawl 274 in a counterclockwise direction as shown in Fig. 11. The sharp nose 280 limits downward movement of screws in the chute and counterclockwise rotation of the pawl is limited by abutment of the pawl against one of the rails 250 of the screw feeding chute 186.

A pawl 284 is pivoted at 286 on the rail 254 near the upper end thereof. The pawl is provided with a sharp finger or nose 288 and with a bifurcated or apertured tail 290. The rod 264 fits through the tail 290 of the pawl 284 and a collar 292 is pinned to the rod above the tail of the pawl and contacting the same so as normally to maintain the nose of the pawl retracted from the path of the screw heads as shown in Fig. 11. A lower collar 294 is pinned to the rod a short distance below the collar 292 and a coil spring 296 is compressed between this collar and the tail 290 of the pawl. The spring normally maintains the pawl tail in contact with the collar 292.

As noted heretofore, the nose of the lower pawl 274 normally lies in the path of the heads of the screws 66 while the nose of the upper pawl 284 normally is held out of this path. The vertical feed chute 222 and the inclined screw feeding chute 186 thus normally may be filled completely. The lower ends of the rails 250 of the inclined screw feeding chute are relieved as at 298 to accommodate the spaced strips or plates 110 of the magazine 72 of the power screw driver. When an operator wishes to refill this magazine he brings the magazine into engagement with the screw feeding chute 186 substantially longitudinally from the position shown in Fig. 11 to that shown in Fig. 13. The strips or plates 110 then form a continuation of the upper surfaces of the rails 250 and the strip or plate 74 engages the lower enlarged portion or collar 270 to slide the rod 264 longitudinally upwardly against the action of the spring 282. This causes the pawl 274 to be rotated clockwise from the position of Fig. 11 to that of Fig. 13 to remove the nose 280 of the pawl from the path of the screw heads. The rod acts through the spring 296 at the same time to pivot the pawl 284 from the position shown in Fig. 11 to that shown in Fig. 13 to cause the nose 288 to engage between the heads of adjacent screws. The spring 296 is provided so that the pawl nose 288 readily may find a space between adjacent screws without causing any jam of the mechanism such as would occur if the pawl were moved with no such resilient link and the nose were aligned with a screw head. With the pawl 274 retracted and the pawl 284 in the path of the screw heads as shown in Fig. 13, all of the screws between the two pawls are free to slide down into the magazine 72. Removal of the screw driver and magazine 72 allows the spring 282 to return the rod and pawls from the position shown in Fig. 13 to that shown in Fig. 11. The slide 126 carried by the magazine 72 is moved by hand to position the pusher finger thereon above the uppermost screw in the magazine as will be apparent. The pusher finger may be ratcheted over the screws in the magazine simply by retracting the slide, or the pusher finger may be retracted from the path of the screw by pushing on the laterally extending flange or tail of the finger while moving the slide up the magazine.

The predetermined number of screws which is metered from the chute 186 into the magazine 72 is adjustable. Apertures 300 for receiving the pivot 286 of the pawl 284 are spaced along the rail 254 and the collars 292 and 294 and adjustable along the rod 264 so that the pawl 284 may be positioned as desired to determine the number of screws which will be metered from the chute into the magazine.

*Replaceable magazine*

In order to feed screws of different sizes or ranges of sizes without replacing the spacers 112 in the magazine or otherwise reconstructing the magazine, I have provided a replaceable magazine 302 shown in Figs. 16-20. The detachable or replaceable magazine 302 has the further advantage that several of these magazines can be filled at the same time and the operator can carry them to his working position. He then can utilize the filled magazines successively without the necessity of returning to a supply station each time he has utilized all of the screws in a magazine.

The magazine 302 includes an elongated mounted plate or strip 74a similar in many respects to the plate 74 and secured to the screw driver 30 in the same manner as plate 74. The screw driver has been omitted from Figs. 16-20 for simplicity of illustration although fragments of the mounting structure have been shown.

The mounting strip or plate 74a comprises an elongated metal strip which is provided along one longitudinal edge with a downturned and then reversely bent flange 304. The end of the plate 74a positioned adjacent the catcher arms of the screw driver is downwardly curved as at 306 and is provided with a plurality of threaded screw receiving apertures 307. A curved plate 308 similar to the curved end 76 of the plate 74 is adapted to be secured to the curved plate portion 306 by a plurality of screws and a pair of curved fingers 310 similar to the curved ends of the strips or plates 110 is spaced from the plate 308 by spacers 312. Elongated slots 314 are arranged transversely of the fingers 310 and screws 316 pass through the slots in the fingers 310, through the spacers 312, through the curved plate 308 and are threaded into the apertures 307 of the curved plate portion 306. The elongated slots 314 allow for transverse adjustment of the fingers 310 as will be apparent.

The end of the mounting strip or plate 74a opposite the curved portion 306 is provided with an end wall 318 extending perpendicularly to the plane of the strip and obliquely to the edges of the strip. The end wall 318 is provided with a flange 320 which is spaced from and is substantially parallel to the strip or plate 74a.

Figures 16, 17, 18, 19, 20:
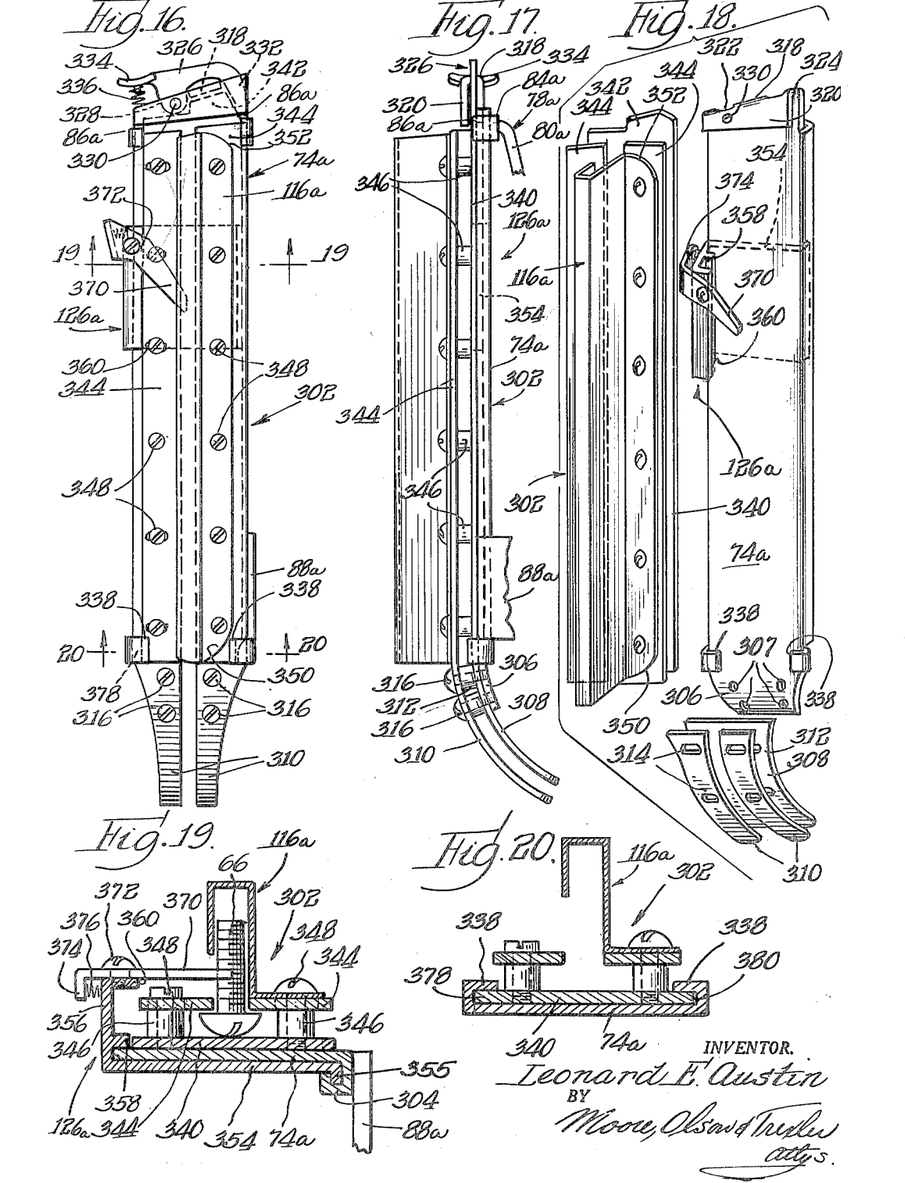
Fig. 16 is a longitudinal view showing a detachable magazine whereby screws of a plurality of sizes may be supplied to the screw driver.
Fig. 17 is an elevational view taken at right angles to Fig. 16.
Fig. 18 is an exploded perspective view showing the parts of Figs. 16 and 17.
Fig. 19 is a cross sectional view taken along the line 19—19 of Fig. 16.
Fig. 20 is a cross sectional view taken along the line 20—20 of Fig. 16.

The end wall 318 is provided with slots 322 and 324 to accommodate a latching member 326. The latching member 326 includes a pivot arm 328 fitting through the slot 322 and pivoted at 330 on a pin extending between the flange 320 and the plate 74a. The latching member further includes a latching finger 332 fitting through the slot 324 and includes a flattened tail 334 extending in the opposite direction therefrom. A biasing spring 336 engages the underside of the tail 334 and normally urges the latching member into the latching position as shown in Fig. 16.

The mounting plate 74a is mounted on a screw driver by structure similar to that heretofore disclosed. This structure includes a bracket 78a having an arm 80a terminated at its upper end by a cross member 84a having inturned ends 86a slidably supporting the upper end of the plate 74a. The lower end of the plate 74a is supported by means of a plate or bracket 88a welded to the side of the downturned and reversely bent flange 304.

The lower end of the plate 74a is provided with a pair of spaced apart confronting lugs or ears 338. These lugs or ears conveniently are formed integrally with the plate 74a and have been shown as so formed although it is apparent that it is not necessary for them to be integral.

The detachable part of the magazine 302 includes a guide strip 340 which is flat and is substantially rectangular in configuration with the exception of a tooth 342 at the upper end thereof which is adapted substantially to abut the end wall 318 on the plate 74a and is of proper width to fit relatively snugly between the pivot arm 328 and latching fingers 342 of the latching member 326. Elongated strips or plates 344 similar to the strips or plates 110 extend substantially from end to end of the guide plate 340. The strips 344 are mounted in spaced apart relation from one another and are spaced from the guide plate 340 by hollow spacers 346. Screws 348 pass through apertures in the strips 344, through the spacers 346, and are threaded into the guide plate 340. The apertures preferably are elongated transversely of the strips to allow adjustment of the strips laterally of one another and thus to vary the width of the slot defined by them. The detachable portion of the magazine 302 further is provided with a guard or channel portion 116a identical with the channel portion 116 with the exception of beveled ends 350 and 352. The channel portion is secured by having the screws 348 pass through a laterally directed flange of the channel member as well as through the strips 344 and spacers 346.

The magazine 302 further includes a slide or pusher member 126a. The slide is similar to the slide 126 and includes a flat plate portion 354 lying against the underside of the mounting plate 74a and having a downturned edge 355 received within the downturned and reversely bent flange 304. The slide further is provided with an upstanding side wall 356 and with an inwardly directed flange 358 overlying the edge of the mounting plate 74a to retain the slide thereon. The upstanding wall 356 further is provided with a laterally directed flange 360 on which is pivoted a pusher finger 370 by means of a screw 372. The pusher finger 370 is provided with a downturned tail or flange 374 and a spring 376 bearing against the inner surface of this flange normally maintains the extremity of the pusher finger 370 extending over the slot formed between the spaced apart strips 344 and thus in engagement with the shank of the uppermost screw therein. The slide is spring urged toward the lower end of the magazine in the same manner as the slide 128. The finger 370 and the flange 360 on which it is mounted are shown as directed parallel to the strips 344 and the screws 348 beneath the finger 370 are shown as of the flat head type to provide greatest clearance to allow great spacing between the strip 340 and the strips 344 when screws with large heads are utilized.

The detachable portion of the magazine 304 is secured to the mounting plate 74a by inserting the lower end of the plate 340 between the confronting ears or lugs 338 and then by shifting the other end of the plate 340 transversely into position beneath the flange 320, sufficient play being provided to allow shifting past the inturned arms 86a. The latching finger 332 of the latching member 326 must be withdrawn for this operation by pressing on the flattened tail 334. Release of the latching member allows the spring 336 to press the latching member into latching position about the tooth 342 of the plate 340. It will be seen that the plate 340 is somewhat narrower than the mounting plate 74a and the lower end of the plate 340 is centralized by inserts 378 and 380 in the confronting ears or lugs 338. The insert 380 is beveled at the upper edge as may be seen in Fig. 16 to facilitate entrance of the plate 340 between the ears.

As noted heretofore, a plurality of magazines may be utilized to accommodate screws of different sizes. The size or range of sizes of screws accommodated by any one magazine readily is set by the use of spacers 346 of proper height and by shifting the strips 344 toward or away from one another. This shifting readily is accomplished due to the elongated screw receiving slots arranged transversely of the strips 344.

Disposable screw cartridges

In certain instances it is not desirable to fill the magazine of my power screw driver directly from a hopper. This may be true when the demand for screws is relatively small or when it is not practical to maintain a hopper anywhere near the screw driving station. In such instances I have found it convenient to provide a predetermined number of screws in disposable cartridges.

A metal cartridge 382 is shown in Figs. 21–25 and includes a substantially channel-shaped section of sheet metal having an elongated back 384, parallel side walls 386, and inturned confronting flanges 388. The flanges are spaced apart a sufficient distance to accommodate the shanks of screws 66 but are not spaced a sufficient distance to allow passage of screw heads therethrough. A plurality of screws 66 is carried in the cartridge 382 with the screw heads fitted within the channel-shaped member and their shanks extending therefrom through the slot defined by the confronting flanges 388. The side walls 386 are deflected toward one another at each end as at 390 to bring the confronting flange 388 sufficiently close together to prevent the passage of screw shanks therethrough and thus to maintain the screws in the cartridge.

The cartridge initially may be filled from a hopper similar to that disclosed heretofore and having a feed chute 392 including spaced apart supporting rails 394 and an overhead rail 396. The lower end of the feed chute 392 is provided with a spreader 398 comprising a pair of brackets 400 secured on opposite sides of the overhead rail 396 by means of screws 402. Each of the brackets 400 is provided with a beveled finger 404 of sufficient height to fit within the channel of the cartridge 382. Insertion of the beveled fingers 404 of the spreader 398 forces the inwardly deflected wall sections 390 away from one another to allow passage of screws from the feed chute 392 into the cartridge 382. Removal of the cartridge from the spreader 398 allows the wall sections 390 to move back toward one another to narrow the slot between the confronting flanges 388 to retain the screws in the cartridge. Screws may be metered from the feed chute 392 by a mechanism similar to that heretofore described or the number of screws passing into the cartridge can be determined in any other suitable manner.

To insert screws from the cartridge 382 into the magazine 72, the deflected wall portions 390 may be split apart permanently by a screw driver or other tool. It is most convenient, however, to provide the receiving end of the magazine with a pair of beveled spreader fingers 406 secured to the plate 74 by any suitable means. These spreader fingers spread the wall portions 390 away from one another in the same manner as insertion of spreader fingers 404 to allow screws 66 to pass from the cartridge 382 into the magazine 72.

Figures 21, 22, 23, 24, 25, 26, 27, 28, 29:
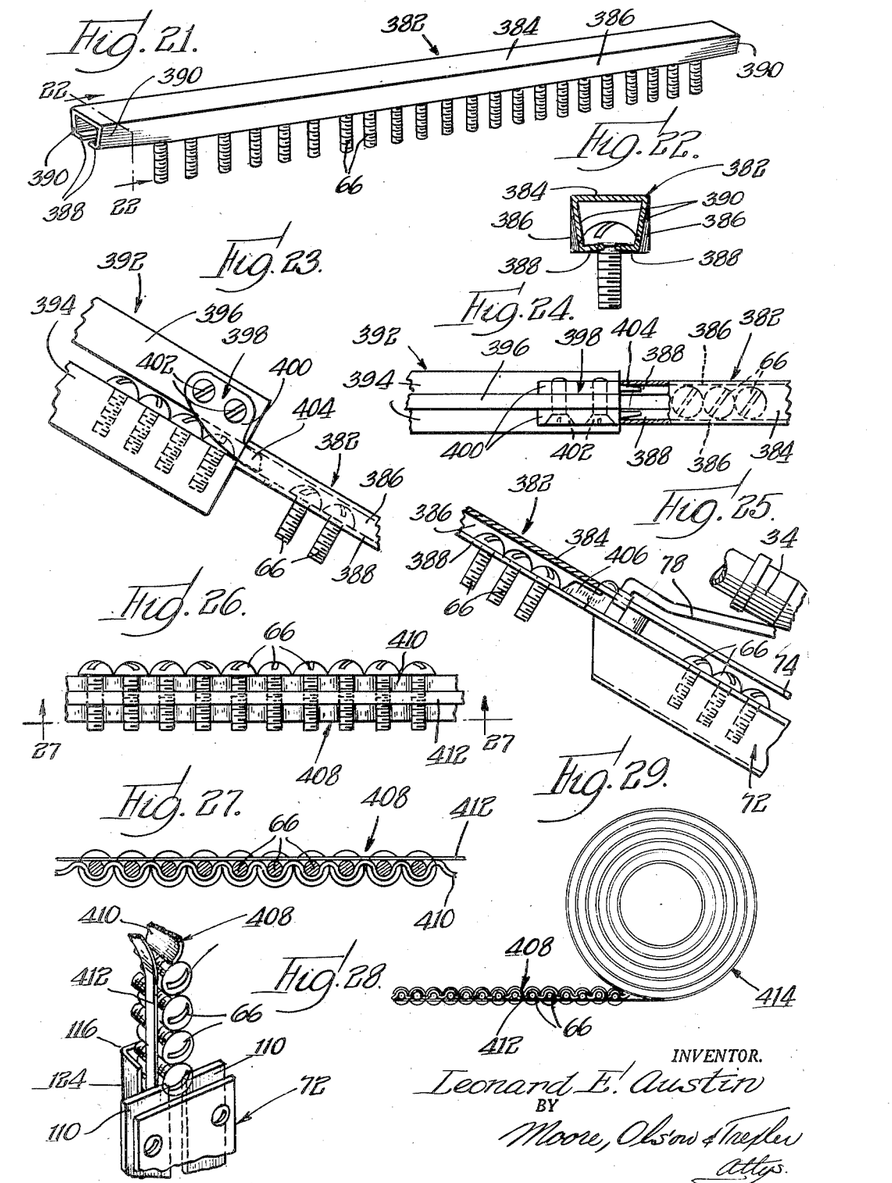
Fig. 21 is a perspective view of a disposable cartridge containing a predetermined number of screws.
Fig. 22 is a cross sectional view taken along the line 22—22 of Fig. 21.
Fig. 23 is a fragmentary elevational view showing the loading of the cartridge from a hopper feed chute.
Fig. 24 is a top view of the parts of Fig. 23.
Fig. 25 is a fragmentary elevational view showing the discharge of screws from the cartridge into the magazine on the screw driver.
Fig. 26 is a fragmentary elevational view of a paper cartridge.
Fig. 27 is a longitudinal sectional view taken along the line 27—27 of Fig. 26.
Fig. 28 shows the insertion of the paper cartridge into the magazine.
Fig. 29 shows a paper cartridge arranged as a continuous roll.

A paper cartridge 408 is shown in Figs. 26–29 and includes an elongated strip of corrugated paper 410. Screws 66 are arranged in the corrugations of the paper strip 410 transversely of the strip with their heads and the ends of their shanks projecting therefrom. The screws are maintained in the corrugations by means of a narrow strip of tape 412 which is secured to the corrugated strip 410 by a pressure sensitive adhesive. Tape coated on one side with a pressure sensitive adhesive is available commercially under a great variety of trademarks and many of these tapes are quite satisfactory for this purpose. The paper cartridge 408 most conveniently is supplied in the form of a spiral roll 414 as shown in Fig. 29. A cartridge of suitable length is torn or cut from the end of the roll and is inserted into the magazine 72 as shown in Fig. 28. The adhesive tape 412 then is gripped at one end and is pulled away from the corrugated paper strip 410 through the slot or gap between the narrow side wall 124 of the channel-shaped member 116 and the strip or plate 110. A pull on the upper end of the corrugated strip 410 then causes this strip to straighten out and to slide out of the magazine leaving the screws in proper position for feeding.

Loading of partially empty magazine

The hopper mechanism and cartridges shown and described heretofore have been explained on the assumption that a magazine will be entirely emptied before refilling. This is the most efficient manner of operation when fasteners are used at a fairly uniform rate. In some assembly or other operations, however, fasteners may not be used at a uniform rate. A large number of fasteners may be driven in a short time, and then a lull may follow during which few or no fasteners are driven. For the most efficient utilization of time, the magazine should be refilled during one of these lulls. Mechanism for discharging a maximum number of fasteners into a magazine without overfilling the magazine is shown in Figs. 30–35. Much of this mechanism is identical with that disclosed heretofore, and similar numbers are utilized to identify similar parts. Substantially similar parts are identified by similar numerals with the addition of the subscript b.

Figures 30, 31, 32, 33, 34, 35:
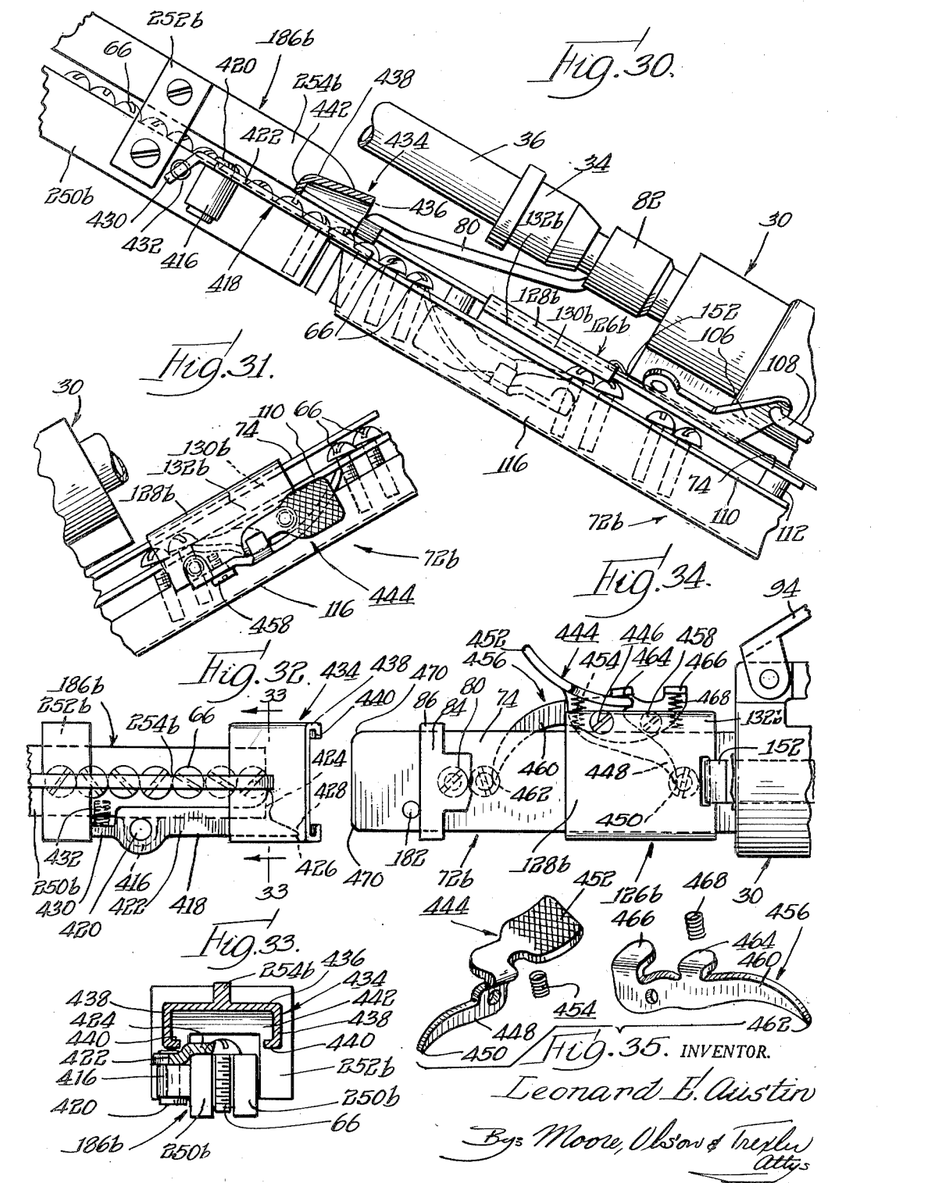
Fig. 30 is a fragmentary view similar to Fig. 13 showing a modified form of my invention.
Fig. 31 is a side view of a portion of the mechanism shown in Fig. 30 taken from the opposite side thereof.
Fig. 32 is a top view of the discharge end of the feed chute shown in Fig. 30.
Fig. 33 is a cross-sectional view taken along a line 33—33 of Fig. 32.
Fig. 34 is a plan view of the receiving end of a fastener magazine.
Fig. 35 is a perspective view of parts of the pusher mechanism shown in Fig. 34.

Referring first to Fig. 30, there is shown an inclined screw feeding chute 186b which may be connected to and receive screws from a hopper identical with the hopper 184 heretofore disclosed. The inclined screw feeding chute 186b includes a pair of spaced apart rails 250b secured by screws and suitable brackets 252b to an overhead rail 254b. The rails 250b have flat upper surfaces continuing to their lower extremities and are not relieved as the rails 250 are relieved at 298.

A lug 416 is secured to one side of one of the rails 250b near the lower end thereof by any suitable means. An escapement pawl 418 is pivotably mounted on a pin 420 carried by the lug 416 and includes a flat body portion 422 lying partially below the upper surface of the rail 250b on which the lug 416 is mounted. A finger 424 on the pawl normally extends into the path of screws fed down the chute 186b and lies above the aforesaid surface. A longitudinally extending portion 426 provides a cam surface 428 adjacent the finger. The pawl 418 is provided with a down-turned tail 430, and a coil spring 432 is compressed between the tail and the adjacent rail. The spring is received in an aperture in the side of the rail and a pin may be provided on the tail properly to align the spring.

A screw driver or gun track or magazine guide 434 is secured to the lower end of the overhead rail 254b in a recess at the lower end thereof preferably by welding. The track guide 434 includes a roof portion 436 inclined slightly relative to the top surface of rails 250b. Substantially parallel side walls 438 depend from the longitudinal edges of the roof portion 436 and are provided with inturned confronting flanges 440. The upper or rear end of the track guide 434 is partially closed by an end wall 442 depending from the roof portion 434.

The screw driver 30 and magazine 72b thereon are identical with those disclosed heretofore except for the changes noted hereinafter. The magazine includes a metal strip or plate 74 and spaced apart strips 110 spaced therefrom to secure screws 66 by the heads with their shanks extending between the strips 110. This portion of the magazine as well as the channel-shaped cover member 116 is identical with that disclosed heretofore. The essential difference between the magazine construction shown in Figs. 30, 31 and 34 and that shown heretofore lies in the construction of the slide or pusher 126b. The slide 126b is similar to the slide 126 in that it is provided with a flat plate or back portion 128b lying against the plate 74, inturned flanges 130b lying against the other face of the plate 74 and a side wall 132b. A flat spring 152 urges the slide along the magazine as disclosed heretofore.

A pusher finger 444 is pivoted on a pin 446 on the side wall 132b and includes an offset and inwardly curved arm 448 having sharp tip 450. The pusher 444 further is provided with a thumb lever 452 and a coil spring 454 is compressed between the thumb lever and the side wall 132b. The spring is received in an aperture in the side wall and a pin preferably is provided on the under side of the thumb lever properly to locate the spring.

A screw loading spacer 456 likewise is pivoted on a pin or screw 458 in the side wall 132b. The spacer 456 includes a hook-like arm 460 having a sharp tip 462 which, like the tip 450 of the pusher, normally extends into the path of screws in the magazine. A transversely extending ear 464 on the spacer overlies a portion of the thumb lever 452 and is in contact therewith. A second transversely disposed ear 466 lies on the other side of the pivot 458, and a coil spring 468 is compressed between this ear and the side wall 132b. The coil spring preferably is received in an aperture in the side wall and is located by a pin on the under side of the ear.

The screw feeding chute 186b is kept full of screws 66 by the hopper to which it is attached. To fill the magazine 72b from the chute, the screw driver is moved from the position shown in Fig. 32 into cooperative engagement with the lower end of the feeding chute as shown in Fig. 30. The magazine plate 74 fits within the track guide 434 and rides on top of the inturned flanges 40. Entrance of the strip or plate 74 into the guide is facilitated by beveled corners 470 on the plate. When inserting movement of the plate 74 is limited by abutment of the bracket cross arm 84 against the depending flanges 438, the plate 74 has its end positioned beneath the end wall 442 and the ends of the strips 110 abut the rails 250b with the top surface thereof in registration. One of the strips 110 engages the cam surface 428 of the escapement pawl 418 and moves escapement finger 422 away from the path of screws 66 in the chute 186b. Screws then slide from the chute into the magazine until they are stopped by the tip 462 of the spacer 456. Removal of the power screw driver 30 from the lower or discharge end of the feeding chute allows the finger 124 of the escapement pawl 418 to return to holding position. Pressure on the thumb lever 452 retracts the tip 450 of the pusher from the path of screws in the magazine. The forward end of the thumb lever lifts ear 464 and retracts the tip 462 of the spacer 456 from the path of screws in the magazine. This allows the screws to slide together and allows the slide to be retracted. The spacing between the pusher and spacer tips 450 and 462 is such that when the slide 126b is retracted to its fullest extent, the pusher tip lies behind or above the last or upper screw in the magazine. Release of the thumb lever 452 allows the springs 454 and 468 to return the pusher and spacer to their original positions with the pusher tip 450 engaging the last screw in the magazine. The spring 152 then urges screws through the magazine as disclosed heretofore.

It will be apparent that I have herein disclosed a portable power screw driver carrying a supply of screws in a magazine wherein the screws are force fed into the screw driver for utilization in any position. The screw driver is usable with many different sizes or ranges of sizes of screws by adjustment or replacement of the magazine. The supply of screws in the magazine readily is replenished and I have disclosed novel structure and cartridges for so replacing the supply.

It will be obvious that the particular embodiments of my invention shown and described are for illustrative purposes only and that various changes can be made in the structural details thereof without departing from the spirit and scope of my invention as expressed in the following claims.

I claim:

1. Apparatus for driving fasteners comprising a body portion, a driving member extending therefrom, means for securing a fastener in alignment with said driving member, means for relatively reciprocating said driving member and said securing means to drive a fastener from said securing means into a work piece, a magazine adapted to contain a plurality of fasteners and terminating adjacent said securing means, means for feeding fasteners positively through said magazine toward the termination thereof, spring urged means for positively advancing fasteners one by one from said magazine to said securing means, means for retracting and releasing said spring urged means in timed relation with the relative reciprocation of said driving member and said securing means to place fasteners in position for driving, and means for adjusting the time and extent of such retraction and release to accommodate fasteners of different sizes.

2. Apparatus for driving fasteners as set forth in claim 1 wherein the means for retracting and releasing the spring urged means in timed relation with the relative reciprocation of the driving member and securing means includes lost motion mechanism and the means for adjusting the time and extent of retraction includes means for adjusting the amount of lost motion.

3. A magazine for use with a driver for headed fasteners comprising a base plate adapted to extend longitudinally of said driver, means for securing fasteners by their heads adjacent said base plate and transversely thereof in contiguous relation, a slide, means for slidably supporting said slide on said base plate, spring means urging said slide longitudinally along said base plate, a finger on said slide, resilient means urging said finger into the path of fasteners carried by said magazine positively to advance said fasteners, said finger being retractable for movement past a new supply of fasteners in said magazine, and an escapement mechanism substantially at the end of said magazine, said escapement mechanism comprising an escapement finger, resilient means positioning said escapement finger in the path of fasteners to retain said fasteners in said magazine, spring means for moving said escapement finger longitudinally along said path, and means adaptable for attachment to a driver to retract said escapement finger in timed relation with the operation of said driver to cause said last named spring means to advance said escapement finger to discharge fasteners one by one from said magazine.

4. A magazine for use with a power screw driver comprising a base plate adapted to extend longitudinally of power screw driver, a pair of spaced apart strips spaced from said base plate and adapted to secure screws by the heads with the shanks of said screws extending transversely of said base plate between said strips, a guard member adapted to overlie the shanks of screws so secured, a slide, means for slidably supporting said slide from said base plate, a spring urging said slide longitudinally of said base plate, a pusher member on said slide, resilient means urging said pusher member against the shank of a screw in said magazine positively to advance screws through said magazine, said pusher member being retractable against the action of said resilient means for movement past the shanks of a new supply of screws in said magazine, and an escapement mechanism at the discharge end of said magazine, said escapement mechanism including a finger, resilient means positioning said finger against the shank of a screw to retain screws in said magazine, spring means for moving said finger toward the discharge end of said magazine from the inside thereof, and means adapted for attachment to said screw driver to move said finger past the shank of a screw toward the inside of said magazine in timed relation with the operation of said screw driver to cause said spring means positively to discharge screws one by one from said magazine.

5. Apparatus for driving rotary threaded fasteners comprising a body portion, a driving member carried thereby, means for rotating said driving member, means for reciprocating said driving member, a mounting plate extending along said body portion and terminating near said driving member, a detachable magazine having a guide plate and restraining means spaced therefrom for containing and guiding rotary threaded fasteners, detachable means for securing said magazine to said base plate, a pusher member, means for slidably mounting said pusher member on said base plate, a spring urging said pusher member along said base plate, an arm on said pusher member, resilient means normally urging said arm into engagement with rotary threaded fasteners in said detachable magazine to advance fasteners positively through said magazine, and means for positively feeding rotary threaded fasteners from said magazine into alignment with said driving member in timed relation with the reciprocation of said driving member.

6. The combination comprising a powered fastener applying tool having a magazine for feeding fastening elements into driving position, a hopper for receiving a heterogeneous mass of said fasteners, a feed chute, means for feeding fasteners in predetermined orientation from said hopper to said feed chute, said feed chute having a discharge end adapted for cooperative engagement with said magazine, and escapement mechanism on said chute operable by cooperative engagement of said magazine and said chute to discharge a predetermined number of fasteners from said feed chute into said magazine.

7. The combination comprising an apparatus for driving rotary threaded fasteners, said apparatus having a magazine for receiving threaded fasteners and feeding them into driving position, a hopper for receiving a heterogeneous mass of rotary threaded fasteners, a feed chute, means for feeding rotary threaded fasteners from said hopper to said feed chute in predetermined orientation, said feed chute having a discharge end adapted for cooperative engagement with said magazine, a pair of spaced apart stops on said feed chute, resilient means normally urging the stop nearest the discharge end of said chute into the path of rotary threaded fasteners in said feed chute, means normally maintaining the other of said stops out of the path of said fasteners in said chute, an elongated rod slidably mounted on said chute and in operative engagement with said stops, and a member on said rod operated by contact with said magazine when said magazine is placed in cooperative engagement with the discharge end of said chute to reverse the position of said stops to discharge a predetermined number of rotary threaded fasteners from said chute into said magazine.

8. Apparatus for metering a predetermined number of fastening elements into the magazine of a power driver, comprising a hopper adapted to receive a heterogeneous mass of fastening elements, a delivery chute, means for feeding a succession of fastening elements from said hopper to said delivery chute in predetermined orientation, a stop member pivotally mounted adjacent the discharge end of said delivery chute, a second stop member pivotally mounted on said delivery chute and spaced a predetermined distance from said first mentioned stop member, said second stop member normally being positioned away from the path of fastening elements in said delivery chute, a push rod, means operatively connecting said push rod to said first mentioned stop member, spring means normally urging said push rod longitudinally to position said first mentioned stop member in the path of fastening elements in said delivery chute, means including resilient means on said push rod for pivoting said second stop member into the path of fastening elements in said feed chute, and means on said push rod adapted to be contacted by a magazine when said magazine is positioned against the discharge end of said delivery chute to shift said push rod against the action of said spring means to pivot said first mentioned stop member out of the path of fastening elements in said delivery chute and to pivot said second stop member into said path to discharge a predetermined number of fastening elements from said feeding chute.

9. A disposable cartridge for supplying headed fastening elements to the magazine of a driver, said cartridge comprising side portions contacting the shanks of said fasteners and lying beneath the heads thereof, and means joining said side portions, said side portions at the ends of said cartridge being spaced closer together than the diameter of the shanks of said fasteners, and said cartridge interfitting with the magazine of a driver whereby shifting apart of said side portions will release fasteners to replenish a supply of fasteners in said magazine.

10. A disposable cartridge for supplying rotary threaded fasteners to the magazine of a power driver, said cartridge comprising a channel-shaped member having top and side walls of sheet material, and inturned confronting flanges on said side walls adapted to underly the faces of rotary threaded fasteners, said side walls and flanges being spaced apart a sufficient distance slidably to support rotary threaded fasteners in said channel member, and said side walls and said flanges at the end of said channel member being spaced apart a lesser distance to retain rotary threaded fasteners within said cartridge, said side walls and flanges being adapted to be spread apart by contact with a magazine to discharge fasteners into said magazine.

11. A disposable cartridge for supplying elongated fasteners to the magazine of a fastener driver comprising a relatively wide strip of corrugated paper or the like, the corrugations of the strip being arranged transversely of said strip and each corrugation being adapted to receive the shank of an elongated fastener, and a relatively narrow strip of paper or the like secured to said corrugated strip and arranged longitudinally thereof to overlie and retain the shanks of said elongated fastening elements in the corrugations of said corrugated strip, said narrow strip being adapted to be pulled transversely away from said corrugated strip through a longitudinal slot in the magazine of a fastener driver to free said corrugated strip for longitudinal removal from said magazine to deposit elongated fasteners from said cartridge in said magazine.

12. A disposable cartridge as set forth in claim 11 wherein the relatively narrow strip is secured to the relatively wide strip by a pressure sensitive adhesive coating on said relatively narrow strip.

13. The combination comprising an apparatus for driving fasteners, said apparatus having a magazine for receiving fasteners and feeding them into driving position, a feed chute, means for supplying fasteners to said feed chute, said feed chute having a discharge end adapted for cooperative engagement for said magazine, an escapement mechanism at the discharge end of said feed chute for normally retaining fasteners therein and adapted to release fasteners upon cooperative engagement of said magazine and said chute discharge end, means on said magazine for positively feeding fasteners therethrough, said feeding means being manually adjustable along said magazine, and means for stopping movement of fasteners into said magazine at a predetemined distance from said feeding means regardless of the position of said feeding means.

14. The combination comprising a power fastener driver having a magazine for feeding fastening elements into driving position, a feed chute, means for feeding fastening elements in predetermined orientation into said feed chute, said feed chute having a discharge end adapted for cooperative engagement with said magazine, an escapement mechanism on said chute, positive feeding means on said magazine, and means for operating said escapement mechanism and said positive feeding means cooperatively upon cooperative engagement of said magazine and said chute to discharge a number of fasteners into said magazine sufficient to fill said magazine.

15. A magazine for use with a driver for fastening elements comprising an elongated fastening element guideway having receiving and discharge ends, a slide mounted for movement along said guide-way, means limiting movement of said slide toward the receiving end of said guide-way, means for urging said slide toward the discharge end of said guide-way, a pair of fingers on said slide having spaced apart tips, and means normally urging said spaced apart tips into the path of said fastening elements in said guide-way, the spacing between said tips being such that the tip nearest the receiving end limits movement of fastening elements into said guide-way to a position where the other of said finger tips will engage behind all fastening elements in said guide-way when said slide is moved to its limiting position toward the receiving end of said guide-way.

16. A disposable cartridge for supplying rotary threaded fasteners to the magazine of a power driver, said cartridge comprising a channel shaped member having top and side walls of sheet material, and inturned confronting edge walls adapted to underlie the clamping faces of rotary threaded fasteners, said side walls and edge walls being spaced apart a sufficient distance slidably to support rotary threaded fasteners in said channel member and at least some of said walls at the end of said channel member being spaced apart lesser distances to retain rotary threaded fasteners within said cartridge, the more closely spaced walls being adapted to be spread apart by contact with a magazine to discharge fasteners into said magazine.

17. Portable apparatus for driving fasteners in substantially any position comprising a body portion, a driving member extending therefrom, means for securing a fastener in alignment with said driving member, means for relatively reciprocating said driving member and said securing means to drive a fastener from said securing means into a work piece, a magazine adapted to contain a plurality of fasteners and terminating adjacent said securing means, means for feeding fasteners positively through said magazine toward the termination thereof, movable means for positively advancing fasteners one by one from said magazine to said securing means, means for operating the advancing means in timed relation with the relative reciprocation of said driving member and said securing means to place fasteners in position for driving, and means for adjusting the time and extent of operation of said advancing means to accommodate fasteners of different sizes.

18. The combination comprising an apparatus for driving rotary threaded fasteners, said apparatus having a magazine for receiving threaded fasteners and feeding them into driving position, a hopper for receiving a random mass of rotary threaded fasteners, a feed chute, means for feeding rotary threaded fasteners from said hopper to said feed chute in predetermined orientation, said feed chute having a discharge end adapted for cooperative engagement with said magazine, a pair of spaced apart stops on said feed chute, means normally maintaining the stop nearest the discharge end of said chute in the path of rotary threaded fasteners in said feed chute, means normally maintaining the other of said stops out of the path of fasteners in said chute, and means at the end of said chute engageable by said magazine when said magazine is placed in cooperative engagement with the discharge end of said chute to reverse the position of said stops to discharge a predetermined number of rotary threaded fasteners from said chute into said magazine.

19. Apparatus for driving fasteners comprising a body portion, a driving member carried thereby, means associated with said body portion for operating said driving member, a magazine supported by and extending along said body portion and terminating near said driving member, said magazine having a guide plate and restraining means spaced therefrom for containing and guiding fasteners to be driven, a pusher member, means slidably mounting said pusher member for movement along said magazine, said pusher member having means thereon adapted to engage the rearmost fastener in said magazine, and a spring urging said pusher member along said magazine in a given direction to urge said fasteners along said magazine into position for driving by said driving member.

20. A portable apparatus for driving fasteners in any position of the portable apparatus, comprising a body, a driving member carried by said body and movable relative thereto, motor means on said body for operating said driving member, fastener holding means carried by said body in alignment with said driving member for holding a fastener in position to be driven, a magazine positioned to one side of the body and extending longitudinally thereof, said magazine including an elongated track holding fasteners with their axes oriented transversely of the track, said track terminating adjacent said fastener holding means and said fastener holding means opening transversely for receipt of fasteners, back up means movably carried by said magazine and spring urged against fasteners in said track for urging said fasteners toward the terminal end of the track, transfer means for transferring fasteners one at a time from the terminal end of the track to the fastener holding means for driving of the fasteners, said track being slidably mounted on said body for longitudinal movement relative thereto, said track and said transfer means being interconnected for movement as a unit longitudinally of said body, and means for so moving said track and said transfer means upon driving of a fastener to effect operation of said transfer means.

21. A portable apparatus for driving fasteners as set forth in claim 20 and further including common means for controlling the operation of the motor means and for effecting movement of the track and transfer means longitudinally of the body.

22. A portable apparatus for driving fasteners as set forth in claim 20 wherein the transfer means is spring operated, and further including means for cocking the transfer means spring upon movement of the transfer means and track longitudinally of the body relatively rearwardly of the driving member, said spring effecting operation of said transfer means upon movement of the transfer means and spring in the opposite direction.

23. A portable apparatus for driving fasteners in any position of the portable apparatus, comprising a body, a driving member carried by said body and movable relative thereto, motor means on said body for operating said driving member, fastener holding means carried by said body in alignment with said driving member for holding a fastener in position to be driven, a magazine positioned to one side of the body and extending longitudinally thereof, said magazine including an elongated track holding fasteners with their axes oriented transversely of the track, said track terminating adjacent said fastener holding means and said fastener holding means opening transversely for receipt of fasteners, the terminal end of said track curving toward said fastener holding means for bringing fasteners into proximity to said fastener holding means and substantially parallel to said driving member, back up means movably carried by said magazine and spring urged against fasteners in said track for urging said fasteners toward the terminal end of the track, and transfer means for transferring fasteners one at a time from the curved terminal end of the track to the fastener holding means for driving of the fasteners.

References Cited in the file of this patent

UNITED STATES PATENTS

| | | |
|---|---|---|
| 1,980,967 | De Mooy | Nov. 13, 1934 |
| 1,984,282 | Ray | Dec. 11, 1934 |
| 1,991,467 | Sawin | Feb. 19, 1935 |
| 2,263,858 | Borge | Nov. 25, 1941 |
| 2,314,760 | Blair | Mar. 23, 1943 |
| 2,328,383 | Lea et al. | Aug. 31, 1943 |
| 2,373,992 | Billinghurst | Apr. 17, 1945 |
| 2,374,558 | Moore | Apr. 24, 1945 |
| 2,471,793 | Stull | May 31, 1949 |
| 2,534,140 | Moore | Dec. 12, 1950 |
| 2,544,165 | Krasnow | Mar. 6, 1951 |
| 2,554,732 | Doyle | May 29, 1951 |
| 2,575,525 | Mitchell | Nov. 20, 1951 |
| 2,607,252 | Shaff | Aug. 19, 1952 |
| 2,657,721 | Shaff | Nov. 3, 1953 |